(12) United States Patent  (10) Patent No.: US 8,220,814 B1
Riviglia et al.  (45) Date of Patent: Jul. 17, 2012

(54) BICYCLE PROPELLED BY STEPPING MOTION

(76) Inventors: Michael F Riviglia, Toronto (CA); Tom Stilo, Etobicoke (CA)

( * ) Notice: Subject to any disclaimer, the term of this patent is extended or adjusted under 35 U.S.C. 154(b) by 0 days.

(21) Appl. No.: 13/164,720

(22) Filed: Jun. 20, 2011

(51) Int. Cl.
*B62M 1/04* (2006.01)
(52) U.S. Cl. .......................... 280/252; 280/221
(58) Field of Classification Search .......... 280/252, 280/221, 256, 257, 258, 259, 260, 261
See application file for complete search history.

(56) References Cited

U.S. PATENT DOCUMENTS

| | | | | |
|---|---|---|---|---|
| 3,954,282 | A * | 5/1976 | Hege | 280/251 |
| 5,630,774 | A * | 5/1997 | Geschwender | 482/57 |
| 6,715,779 | B2 * | 4/2004 | Eschenbach | 280/221 |
| 6,764,088 | B2 * | 7/2004 | Hung | 280/221 |
| 7,878,520 | B2 * | 2/2011 | Jang | 280/253 |
| 2003/0111821 | A1 * | 6/2003 | Chow | 280/256 |
| 2007/0024019 | A1 * | 2/2007 | Tarlow et al. | 280/221 |
| 2007/0235974 | A1 * | 10/2007 | Vargas | 280/256 |
| 2010/0096826 | A1 * | 4/2010 | Baek et al. | 280/252 |
| 2010/0295263 | A1 * | 11/2010 | Teal et al. | 280/221 |
| 2011/0031715 | A1 * | 2/2011 | Lin | 280/257 |
| 2011/0057411 | A1 * | 3/2011 | Scolari et al. | 280/221 |
| 2012/0013097 | A1 * | 1/2012 | Fan | 280/221 |

* cited by examiner

*Primary Examiner* — Tashiana Adams (57) ABSTRACT

A bicycle propelled by stepping motion comprises a frame, forward and rear wheels, and a steering wheel. A pair of elongate pedals extend rearward from a pivot connection to the frame. An axle is mounted for rotation to the frame and has a crank arm at either end. A drive sprocket is fixed to the axle for rotation in a vertical plane, and an endless chain couples the drive sprocket to a rear wheel sprocket. Each pedal carries a connecting structure that receives an associated connecting element that extends horizontally from one of the crank arms. The connecting structure defines an arcuate path along which the associated connecting element is constrained to displace. The path is so shaped that the connecting structure engages the connecting element with a contacting surface oriented normal to the circle which the connecting element is constrained to follow by virtue of connection to the crank arm. Less force is misdirected and smoother operation is obtained.

21 Claims, 6 Drawing Sheets

BICYCLE PROPELLED BY STEPPING MOTION

FIELD OF THE INVENTION

The invention relates generally to bicycles, and more specifically, to bicycles designed to be propelled by stepping motion rather than rotation of pedals.

BACKGROUND OF THE INVENTION

Conventional bicycles are propelled by rotary motion. Foot pedals are mounted to crank arms that rotate on the bicycle frame. The crank arms in turn rotate a large central drive sprocket coupled by an endless chain to a rear wheel sprocket. As the rider moves the pedals in circles, the rear wheel rotates in a forward angular direction, propelling the bicycle. A bicycle may be easier to operate if a rider were able simply to step up and down on pedals.

The prior art has proposed numerous bicycles and similar vehicles that operate in response to stepping motion, sometimes referred to in the prior art as rectilinear or reciprocating motion. One example is to be found in U.S. Pat. No. 1,332,185 to Brown which describes a stepper tricycle with a drive mechanism that includes a pair of ratchet wheels mounted on a rear axle. A pair of elongate pedals, pivoted to a forward section of the tricycle frame, carry blade-like pawls that mesh with the ratchet wheels. Each pedal thus applies a propelling torque to the axle as the pedal descends under the user's weight, and a biasing spring restores the pedal to a raised position afterwards.

U.S. Pat. No. 1,601,249 to Hayden describes a stepper cycle that has two pedals pivoted to the front of its frame. Once again, there is no central drive sprocket, rear wheel sprocket and endless chain. Instead, each pedal carries a near-vertical, toothed track that is meshed with a pinion mounted on a rear axle. Each pedal consequently delivers a torque to the rear axle and ultimately to a rear wheel, which is mounted by clutches to the rear axle, whenever the user steps on the pedal. Springs restore the pedals to an upper position after each step.

U.S. Pat. No. 2,449,266 to Woods describes a stepper cycle which has two elongate pivoting pedals. The pedals are coupled to the axle on which rear wheels are mounted. Each pedal is associated with a linkage that pulls a short length of chain, wrapped around a sprocket, as the pedal descends. The sprocket is mounted on the exterior of a clutch mechanism adapted to rotate the axle. A spring mechanism is used to restore each pedal to an upper position.

U.S. Pat. No. 3,913,945 to Clark discloses a stepper bicycle that more closely resembles a conventional bicycle but, once again, has no central drive sprocket. Two curved pedals are pivoted to a forward section of the cycle and carry conventional cycle-like pedals. Downward displacement of a pedal causes a chain to be drawn around a sprocket coupled to the rear wheel, propelling the bicycle. Two springs compress as the pedals pivot downward and serve to restore the pedals to their starting positions.

U.S. Pat. No. 5,335,927 to Islas discloses another bicycle propelled by stepping action. Two pedals are pivoted to rear sections of the bicycle frame and extend forward to support pedals. An elaborate system of pulleys, sprockets, and chain couples the pedals to the rear wheel.

U.S. Pat. No. 5,716,069 to Bezerra et al describes a compact mechanism which in essence replaces the conventional pedals and central drive sprocket associated with a bicycle, allowing stepping action on pedals to be converted into torque. The mechanism includes a housing that contains one shaft about which two pedal levers pivot and another shaft that supports a large drive sprocket at one side of the mechanism. A combination of clutch assemblies, pinions, and toothed racks, all compactly mounted in the housing, enables the drive sprocket to rotate in response to stepping action on the pedals. The drive sprocket is coupled to the rear wheel of the bicycle via a sprocket coaxial with the rear wheel and an endless chain coupling the sprockets.

U.S. Pat. No. 5,871,221 to Min et al describes a drive mechanism for a stepper-type bicycle that locates where the large central drive sprocket of a conventional bicycle is normally positioned. The mechanism includes a transverse drive shaft bearing mounted for rotation within a horizontal drum. Right and left pedal arms are mounted to opposite ends of the drive shafts and cause a length of drive chain to be drawn over a conventional rear wheel sprocket. An upper end of the chain is fixed to one "pulling rod" and a lower end, to another. The pulling rods cooperate to pull the upper length of chain forward, rotating the rear wheel sprocket.

U.S. Pat. No. 6,334,838 to Lee describes an exercise cart that has a mechanism for powering its rear wheels in response to a rider's stepping action. The mechanism uses a pair of gears that are bearing mounted on a common rod to either side of a drive sprocket. Two pivoting pedals are provided, and each carries on its underside a curved driving element formed with transverse teeth, that meshes with one of the gears. An endless chain couples the drive sprocket and a rear wheel sprocket. When either pedal is depressed, the associated gear is rotated, which in turn rotates the drive sprocket and ultimately the cart's rear wheels. The patent proposes using two hydraulic cylinders as springs to restore the pedals to their uppermost position.

U.S. Pat. No. 6,334,838 to Kugel et al discloses a stepper bicycle with a central drive sprocket coupled to a rear wheel sprocket with an endless chain, as in a conventional bicycle. Drive mechanisms are located on either side of the drive sprocket. Each mechanism includes an elongate housing with a U-shaped cross-section, and a flat rectangular gear that slides in the housing and has gear teeth along one side edge. The housing has a vertical slot through which a pedal is attached to the sliding rectangular gear. A "quadrant" gear is fixed to the shaft supporting the drive sprocket. The quadrant gear has a part-circular peripheral edge which has gear teeth meshed with those of the sliding rectangular gear. Thus, as the rectangular gear is forced downward, the drive sprocket is rotated in a forward angular direction. Tops of the sliding rectangular gears of the two drive mechanisms are coupled by a cable that runs over two overhead pulleys so that, as one is forced downward by foot, the other gear (decoupled by a clutch mechanism) is raised in preparation for another power stroke.

U.S. Pat. No. 6,648,355 to Ridenhour discloses yet another stepper bicycle. Two pedals are mounted on arms hinged to a forward part of the bicycle frame. A D-shaped bracket (quadrant member) is attached to the pedal bracket. One end of a length of chain is fixed to the D-shaped bracket, which has a chain track adapted to wrap the chain along the periphery of the bracket. Thus, as the pedal is depressed, the D-shaped bracket pulls the chain down and forward. The pulling action on the chain is converted by a power transfer assembly into a rotation of the rear wheel. The power transfer assembly includes a shaft journalled for unidirectional rotation on support plates. A sprocket is fixed to the shaft and carries a chain that drives rear wheel. Clutches are mounted on the shaft, and a length of pull chain, for example, runs over a pulley associated with the clutch. A pair of coil springs are used to restore the pedals to their upper position. The coil springs are mounted around clutches and fixed against rotation by locating a hooking end about the frame shaft. One coil spring is tensioned as a pedal is depressed and chain is pulled. When the pedal is released, the coil spring then draws the chain back, restoring the pedal.

U.S. Pat. No. 6,749,211 to Yliniemi discloses a bicycle in which stepping on pedals rotates a front wheel. The bicycle has a force converting mechanism that includes a line consisting of a near vertical length of spring, an intermediate length of chain wrapped around a forward wheel sprocket, and a length of cable that travels over a pulley and fastens to an upper end of a pedal. The spring assists in keeping the line taut and in restoring the pedal to an upper position.

Canadian patent application no. 2,296,166 to one of the inventors of the present invention was laid open for public inspection on Jul. 17, 2001. The prior patent application describes a stepper bicycle whose general features have been adopted for implementation of the present invention. The bicycle has a frame to which forward and rear wheels are mounted, and a steering wheel coupled to the forward wheel. A drive sprocket is fixed to an axle which is mounted for rotation on the frame, and an endless chain couples the drive sprocket to a rear wheel sprocket to apply torque to the rear wheel. The bicycle comprises a pair of elongate pedals positioned one to either side of the frame, and extending rearward from a pivot connection at a forward section of the frame. Each pedal comprises an apertured member formed with a large opening. The axle has a pair of crank arms, and each crank arm has a horizontal member that extends into a different one of the openings defined by apertured members. As the rider steps on each pedal, downward pivoting of the pedal effectively applies a torque to the drive sprocket which in turn applies a torque to the rear wheel. An object of the invention is to improve the efficiency of such a bicycle and to provide smoother operation.

BRIEF SUMMARY OF THE INVENTION

In one aspect, the invention provides a bicycle propelled by stepping motion. The bicycle comprises a frame, forward and rear wheels mounted to the frame for rotation about horizontal axes, and a steering wheel coupled to the forward wheel for steering in a conventional manner. An axle is mounted to the frame for relative rotation about a horizontal rotational axis, and a drive sprocket is fixed to the axle for rotation together about that axis. A driven sprocket is mounted to the rear wheel for rotation together in a forward angular direction about the horizontal rotational axis of the rear wheel, and an endless chain couples the sprockets for rotation together.

The bicycle includes a pair of pedals mounted on opposing sides of the frame for pivoting between upper and lower positions. The rider generates a propelling force by stepping on each pedal in its upper position, displacing the pedal downward towards its lower position, and biasing means urge each pedal back to its upper position. Each pedal is associated with motion converting means that rotate the drive sprocket in a forward angular direction in response to the downward pivoting of the pedal. The motion converting means comprise a crank arm and a clutch mechanism that couples the crank arm to the axle such that the crank arm rotates with the axle in the forward angular direction but freewheels relative to the axle when rotated in an opposite angular direction relative to the axle. The motion converting means also include a connecting element attached to the crank arm such that the connecting element revolves in a circle centered about the rotational axis of the axle as the crank arm rotates. A connecting structure is attached to the pedal and supports the connecting element for relative sliding displacement along an arcuate path defined by the connecting structure. The arcuate path is shaped to ensure that, as the pedal pivots between its upper and lower positions, the connecting structure remains oriented, at its point of contact with the connecting element, substantially normal to the direction of the circle along which the connecting element revolves. The advantage obtained is smoother motion of the pedals and consequently other components of the bicycles propelling mechanism. If not already apparent, a rider propels the bicycle by simply stepping repeatedly on the pedals in a reciprocating fashion.

This disclosure describes two methods of implementing a connecting element and complementary connecting structure adapted to slide relative to one another along an appropriately shaped arcuate path. In one embodiment, the connecting structure is formed with a curved slot, substantially part-circular, that effectively defines the arcuate path, and the connecting element extends horizontally into and travels along the slot as the pedal displaces between its upper and lower positions. In another embodiment, which is substantially an inverse arrangement, the connecting structure comprises a rod shaped to define the arcuate path, and the connecting element comprises a part formed with an open-ended passage through which the rod extends. The connecting element is preferably mounted to an associated crank arm for rotation so that the part can tilt to accommodate the curvature of the rod.

Other aspects of the invention will be apparent from the description below of preferred embodiments and will be more specifically defined in the appended claims.

DESCRIPTION OF THE DRAWINGS

The invention may be better understood with reference to drawings in which.

DESCRIPTION OF PREFERRED EMBODIMENTS

Figure 1:
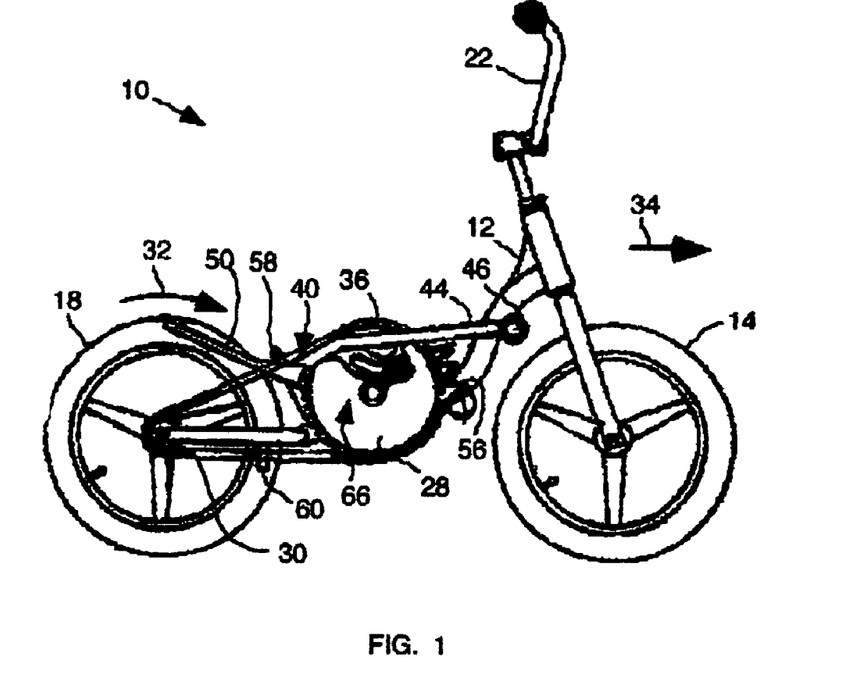
FIG. 1 is a side elevation of a bicycle embodying the invention.
Figure 2:
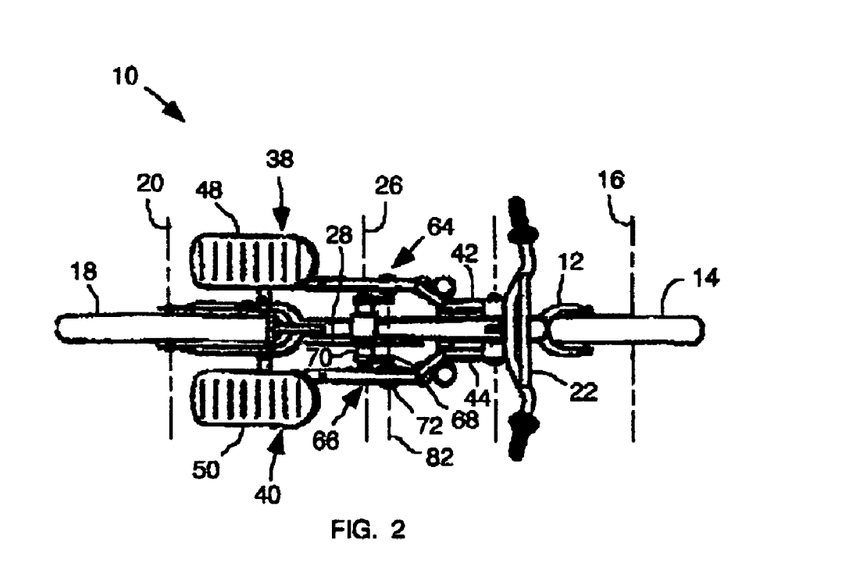
FIG. 2 is a plan view of the bicycle.

Reference is made to FIGS. 1 and 2 which illustrate a bicycle 10 adapted to be propelled by stepping motion. The bicycle 10 has a conventional steel frame 12 to which various components are mounted. A forward wheel 14 is mounted to the frame 12 for relative rotation about the horizontal rotational axis 16 of the forward wheel 14. A rear wheel 18 is mounted to the frame 12 for relative rotation about the rotational axis 20 of the rear wheel 18, also horizontal oriented. A steering wheel 22 is mounted to the frame 12 for rotation about a generally vertical axis (not indicated) and is coupled to the forward wheel 14 for steering of the bicycle 10. The bicycle 10 is operable with no seat, as illustrated, but a seat may be mounted to the frame 12 if desired. These aspects of the bicycle 10 are conventional and will not be described in greater detail.

The bicycle 10 has a drive mechanism which includes an axle 24 (apparent in FIGS. 3-6) bearing mounted in a conventional manner to the frame 12 for relative rotation about a horizontal axis 26, which is the central lengthwise rotational axis of the axle 24. A large central drive sprocket 28 is oriented in a vertical plane containing the rear wheel 18, and fixed to the axle 24 for rotation together about the axle's rotational axis 26. A driven sprocket 30 is mounted co-axially with the rear wheel 18 for rotation together about the rotational axis 20 of the rear wheel 18 in a forward angular direction 32, namely, the angular direction that propels the rear wheel 18 and consequently the bicycle 10 in a forward direction 34. The driven sprocket 30 is preferably, but not necessarily, mounted to the rear wheel 18 with a clutch mechanism (not illustrated but common to everyday bicycles whose rear wheels are adapted to provide multiple gear ratios) that allows the driven sprocket 30 to free-wheel relative to the rear wheel 18 when the driven sprocket 30 rotates in the opposite angular direction. An endless chain 36 couples the drive sprocket 28 and the driven sprocket 30 for rotation together. Once again, these components are conventional and consequently will not be described in greater detail.

Figure 3:
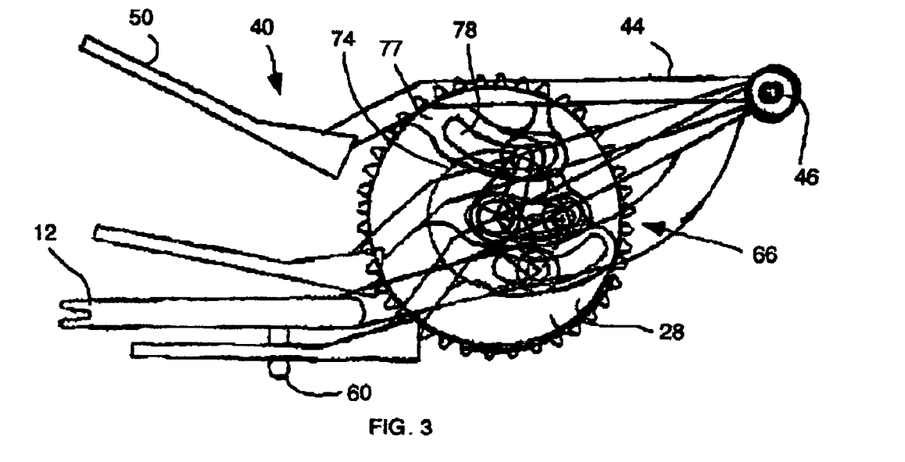
FIG. 3 is a side elevation showing a right pedal and parts of an associated mechanism for converting stepping motion into a propelling torque at different points during movement of the pedal from an uppermost position to a lowermost position.
Figure 4:
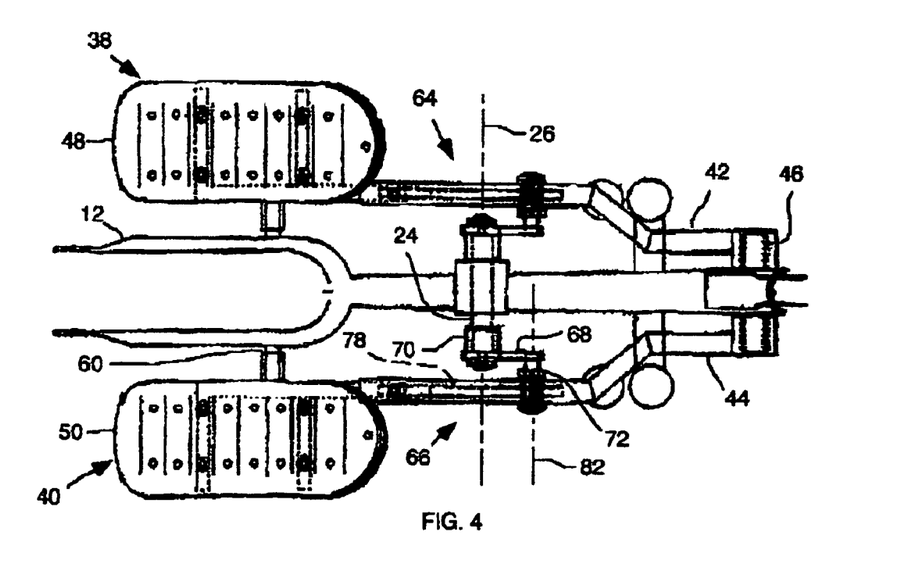
FIG. 4 is a fragmented plan view further detailing motion converting mechanisms associated with the bicycle.
Figure 5:
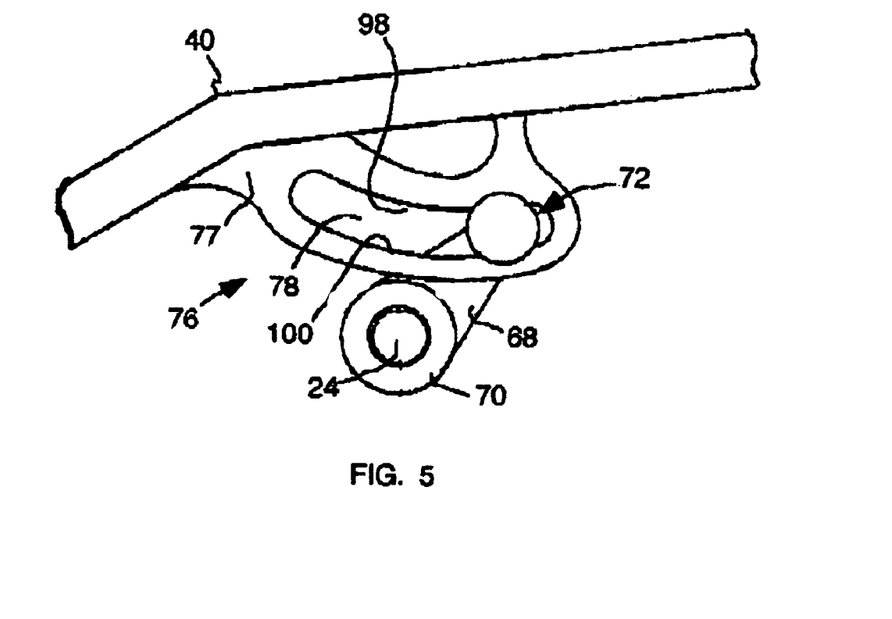
FIG. 5 is a fragmented side elevation further detailing the motion converting mechanism associated with the right pedal.
Figure 6:
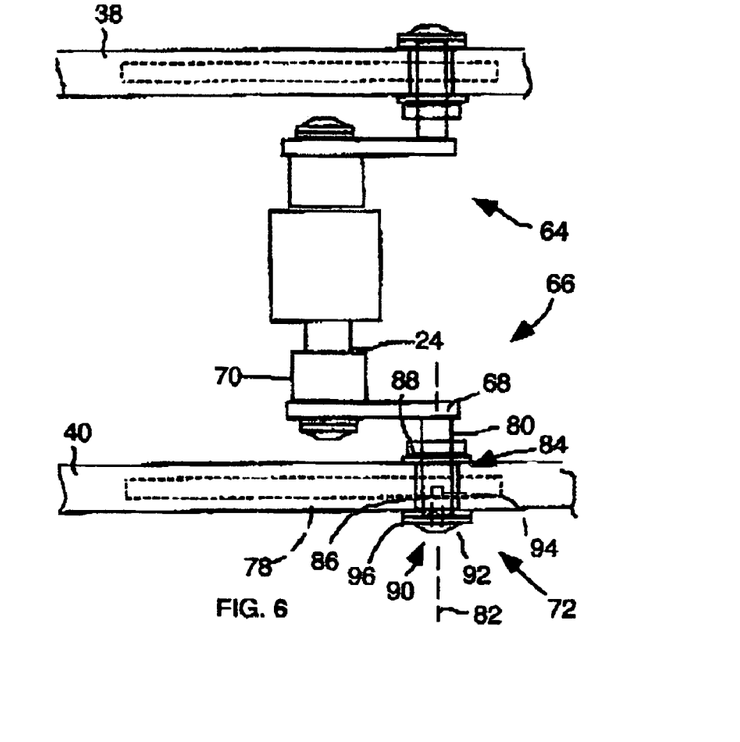
FIG. 6 is a fragmented plan view of the motion converting mechanisms associated with the pedals of the bicycle.

The bicycle 10 includes a pair of elongate pedals 38, 40 located to opposite side of the frame 12. Each pedal 38 or 40 has a forward end portion 42 or 44 mounted to the frame 12 for pivoting in a vertical plane about a horizontal shaft 46. Each pedal 38 or 40 has an opposing rear end portion that comprises a foot rest 48 or 50 adapted to comfortably support a rider's foot. The right pedal 40, which is typical, pivots between an upper position and a lower position as shown in FIG. 3. The right pedal 40 is biased by a coil spring 56, acting between the frame 12 and the bottom of the right pedal 40, toward its upper position which is defined by an upper stop 58. The right pedal 40 will normally be urged by a user's body weight via his right foot toward the pedal's lower position which is defined by a lower stop 60. The left pedal 38 is similarly biased by a coil spring to an upper position against an upper stop and can be forced downward by the rider to a lower position against a lower stop. Rubber pads (not illustrated) may be located at lower ends of the springs to cushion the impact of pedals 38, 40 engaging the lower stops.

Each pedal 38 or 40 is associated with a motion converting mechanism 64 or 66 for converting downward motion of the pedal 38 or 40 into a rotation of the drive sprocket 28 in the forward angular direction 32. The mechanism 66 associated with the right pedal 40 (referred to below as the "right mechanism") is illustrated throughout FIG. 3 to FIG. 6 and will be described in detail below. The mechanism 64 associated with the left pedal 38 is substantially identical to the right mechanism 66 and consequently will not be described.

The right mechanism 66 includes a crank arm 68, and a clutch mechanism 70 that couples the crank arm 68 to the axle 24 to achieve two results: first, the crank arm 68 rotates with the axle 24 in the forward angular direction 32, essentially as a single unit; and second, the crank arm 68 free-wheels relative to the axle 24, effectively disconnected from the axle 24, when the crank arm 68 rotates in the opposite angular direction relative to the axle 24. The clutch mechanism 70 is preferably a ratchet and pawl, particularly a conventional type in which the ratchet is a rotary star-shaped element within a cylindrical casing, and the pawl is effectively defined by pins pressed against the casing or released by rotating the star-shaped element. Such a mechanism is disclosed in published Canadian Patent Application no. 2,296,166.

The motion converting mechanism 66 also includes a connecting element 72 attached to the crank arm 68 and spaced from the rotational axis 26 associated with the axle 24. The connecting element 72 is consequently mounted for revolution about the rotational axis 26 of the axle 24 as the crank arm 68, and displaces along a circle 74 centered about the rotational axis 26. In operation, the range of movement of the connecting element 72 is restricted to a sector of the circle 74 spanning slightly less than 180 degrees, and the connecting element 72 essentially pivots back and forth as the right pedal 40 displaces between its upper and lower positions. The connecting element 72 serves essentially to couple and transmit forces between the drive sprocket 28 and the right pedal 40 through a connecting structure 76 attached to the right pedal 40.

In this embodiment, the connecting structure 76 is a plate 77 welded to the bottom of the right pedal 40 in a vertical orientation. As is most apparent in FIG. 5, the plate 77 comprises a curved slot 78 that receives the connecting element 72 and defines an arcuate path along which the connecting element 72 is constrained to displace in sliding contact with surfaces associated with the slot 78. The connecting element 72 is show in detail in FIG. 6 where it may be seen to comprise a circular shaft 80 that extends horizontally into the slot 78 along an axis 82. The connecting element 72 also comprises a bushing 84 (apparent in FIG. 6) with a cylindrical body 86 that surrounds the circular shaft 80 and extends into the slot 78. The bushing 84 is formed of a sacrificial material (a plastic) softer than the material (steel) of the plate 77 and the shaft 80 of the connecting element 72, and smoothes movement of the circular shaft 80 relative to the slot 78. The bushing 84 is retained by a circular collar 88 mounted on the shaft 80 flush against the bushing 84 and retained with a set screw (not illustrated) threaded into the collar 88 and bearing against the exterior of the shaft 80. The connecting element 72 also comprises a retaining element that fastens the connecting element 72 to the connecting plate 77. The retaining element is a threaded fastener 90 comprising a large head 92 that overlays the curved slot 78 and a threaded shaft 94 attached to its head 92 and threaded centrally and lengthwise into the circular shaft 80. The head 92 of the fastener 90 bears against a washer 96 marginally spaced from the outer surface of the plate 77 by one end of the bushing 84. The slot 78 has a substantially uniform width, at least along that portion of the slot 78 traveled by the connecting element 72, conforming substantially to the outer diameter of the bushing 84. The arcuate path is so shaped that the connecting structure 76 engages the connecting element 72 substantially normal to the circle 74 along which the connecting element 72 is otherwise constrained to revolve; that is, at their point of contact or zone of contact, the surface of the connecting structure 76 immediately contacting the connecting element 72 for transfer of forces is essentially normal to the circle 74. The shape of the slot 78 was determined using standard drafting techniques and a CAD software package that allows drawn components to be rotated or pivoted successively to different relative orientations expected during operation.

The relative orientation of the connecting structure 76 and the connecting element 72 at different stages during downward pivoting of the right pedal 40 is shown in FIG. 3. When the right pedal 40 is located at its upper position the surface 98 of the connecting plate 77 defining the upper boundary of the slot 78 engages the shaft 80 of the connecting structure 76 substantially normal to the circle 74. This relationship will also be apparent at the midpoint in the down stroke of the right pedal 40, and when the right pedal 40 is at its lower position. The advantage obtained is that substantially all force applied to the connecting element 72 is tangential to the circle 74, and tends to displace the connecting element 72 along its circular path about the axle 24. Less force is misdirected, which produces no useful result and requires reaction into the crank arm 68, the axle 24 and supporting structure, than might occur, for example, in the bicycle described in Canadian Patent Application No. 2,296,166. The overall advantages are greater efficiency and smoother operation. During the upstroke of the right pedal 40, which is less critical since weight is not then applied to the right pedal 40, the surface 100 of the plate 77 defining the lower boundary of the slot 78, which is essentially parallel to the upper bounding surface 98, also engages the substantially normal to the circle 74 along which the connecting element 72 revolves.

The bicycle 10 is operated in essentially the same manner as earlier stepper bicycles. The rider stands on the pedals 38, 40 and grips the steering wheel 22 for balance. The rider propels the bicycle 10 by stepping with full weight in an alternating fashion on the left and right pedals 38, 40. As one pedal 38 or 40 descends in a power stroke under the rider's weight, the other pedal 38 or 40 rises under the influence of one of the biasing springs to its uppermost position in preparation for the next power stroke. Each stepping motion is converted by the left or right motion converting mechanism 64 or 66 into a driving torque that rotates the axle 24 and the drive sprocket 28 in the forward angular direction 32. The endless chain 36 in turn applies a torque to the driven sprocket 30 that rotates the rear wheel 18 in the forward angular direction 32, propelling the bicycle 10 forward.

Reference is made to FIGS. 7-10 which illustrate the bicycle 10 of FIG. 1 modified to incorporate alternative left and right motion converting mechanisms 102, 104 that rotate the drive sprocket 28 in response to up and down pedal motion. Only modifications to the bicycle 10 will be described, and components of the bicycle 10 that remain unchanged are identified with the same reference numerals used above and may be understood with reference to the description above of the components of the bicycle 10. Once again, the left motion converting mechanism 102 is essentially identical to the right motion converting mechanism 104 and consequently only the right mechanism 104 will be described.

Figure 7:
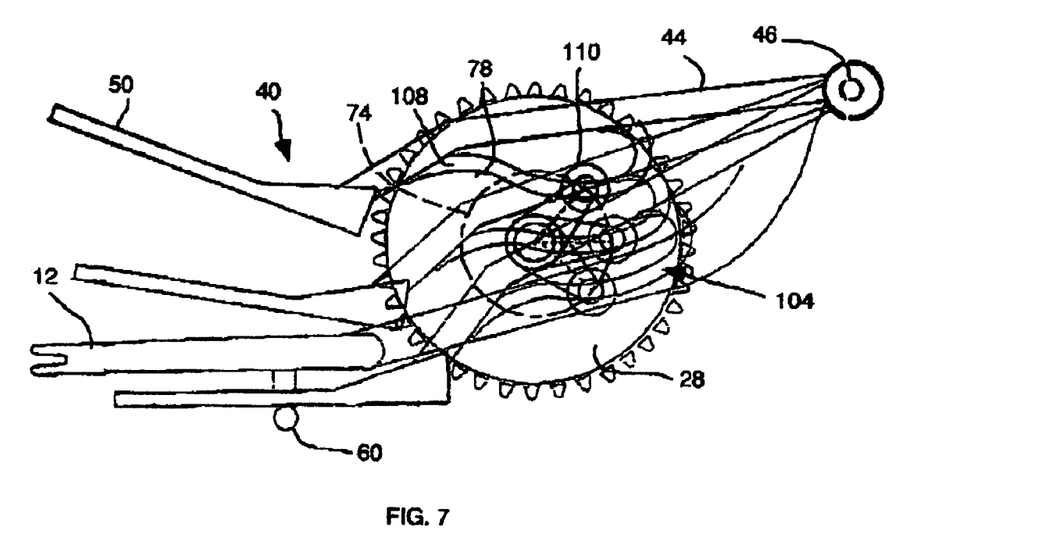
FIG. 7 is a side elevation showing the right pedal together with an alternative mechanism for converting stepping motion into a propelling torque at different points during movement of the pedal from an uppermost position to a lowermost position.
Figure 8:
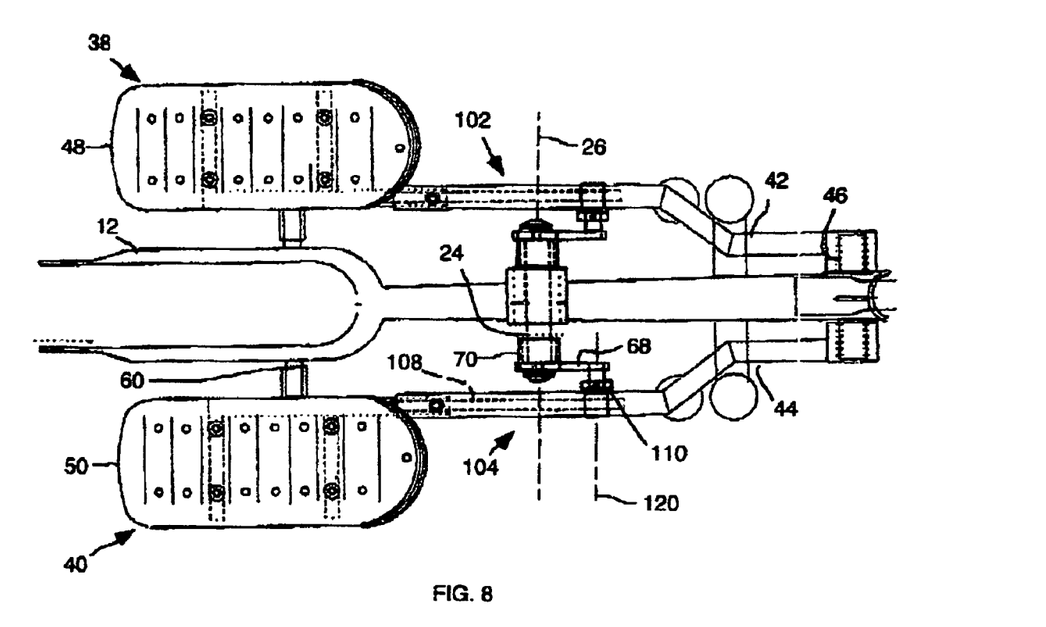
FIG. 8 is a fragmented plan view further detailing the alternative motion converting mechanism.
Figure 9:
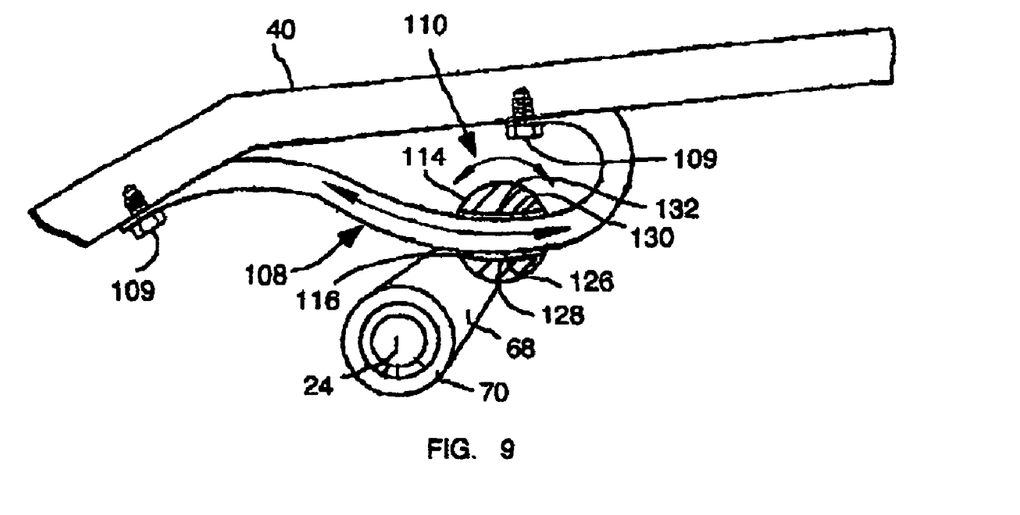
FIG. 9 is a fragmented side elevation further detailing the alternative motion converting mechanism.
Figure 10:
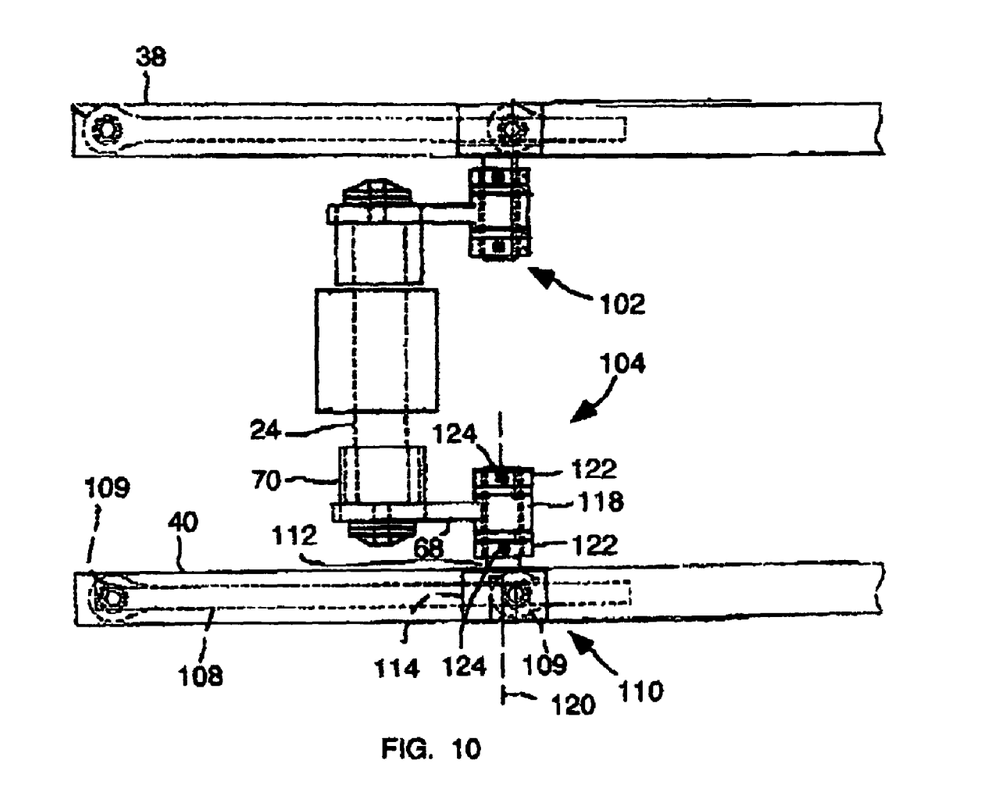
FIG. 10 is a fragmented plan view of the alternative mechanism attached to both pedals of the bicycle.
Figure 11:
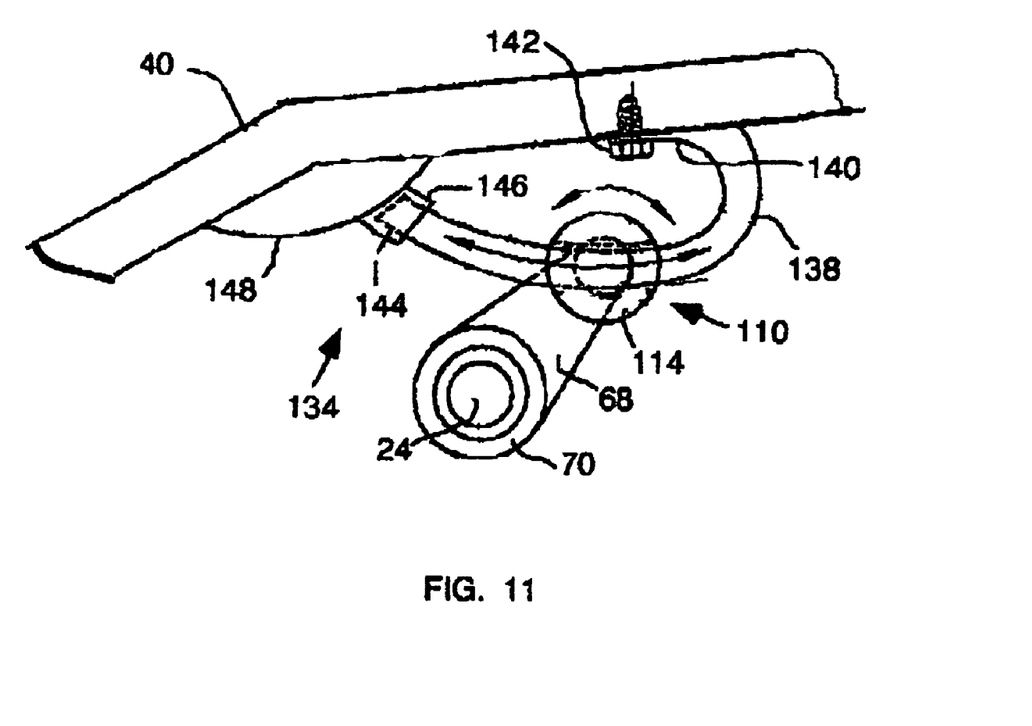
FIG. 11 is a fragmented side elevation showing a connecting structure that can be substituted for a corresponding connecting structure in the alternative motion converting mechanism.

The connecting structure 106 comprises a rod 108 bent to define substantially the same arcuate path provided by the slot 78 described above. The rod 108 is attached to the underside of the right pedal 40 with screws 109 at ends of the rod 108. The associated connecting element 110 comprises a generally horizontal, circular shaft 112 and a part 114 fixed to the shaft 112 and formed with an open-ended passage 116. This arrangement mounts both the shaft 112 and the part 114 for revolution along the circle 74 centered on the rotational axis 26 of the axle 24, as indicated in FIG. 7. The open-ended passage 116 of the part 114 receives the rod 108 with minimal clearance and effectively mounts the connecting element to the connecting structure 106 for relative sliding displacement.

To accommodate the curvature of the rod 108 and avoid jamming, the part 114 is supported for rotation relative to the rod 108. More specifically, as apparent in FIG. 10, a cylindrical sleeve 118 attached to the socket 146 dimensioned to receive the end 144. The socket 146 is welded to a steel support structure 148, and the support structure 148 is in turn welded to the underside of the right pedal 40. The rod 138 is for practical purposes identical in shape to the rod 108 of the earlier described connecting structure 106, and the connecting element 110 is consequently constrained to engage the connecting element 110 oriented substantially normal to the circle 74 along which the connecting element 110 revolves as the right pedal 40 displaces between upper and lower positions.

It will be appreciated that particular embodiments of the invention have been described and that modifications may be made therein without departing from the spirit of the invention or necessarily departing from the scope of the appended claims.

| Parts List for Bicycle | |
|---|---|
| 10 | bicycle |
| 12 | frame |
| 14 | forward wheel |
| 16 | horizontal rotational axis (forward wheel - FIG. 2) |
| 18 | rear wheel |
| 20 | rotational axis (rear wheel - FIG. 2) |
| 22 | steering wheel |
| 24 | axle |
| 26 | horizontal rotational axis (axle - FIG. 2) |
| 28 | drive sprocket |
| 30 | driven (rear wheel) sprocket |
| 32 | forward angular direction |
| 34 | forward direction (relative to bicycle) |
| 36 | endless chain |
| 38, 40 | pedals (left and right) |
| 42, 44 | forward end portion (pedals - left & right) |
| 46 | horizontal shaft (mounting pedals for pivoting) |
| 48, 50 | foot rest (left and right) |
| 52 | not used |
| 54 | not used |
| 56 | coil spring (for right pedal) |
| 58 | upper stop (for right pedal) |
| 60 | lower stop (for right pedal) |
| 62 | not used |
| 64, 66 | motion converting mechanism (left & right generally) |
| 68 | crank arm |
| 70 | clutch mechanism |
| 72 | connecting element |
| 74 | circle of revolution (connecting element around axle) |
| 76 | connecting structure |
| 77 | plate (connecting structure - at bottom of right pedal) |
| 78 | slot (plate) |
| 80 | circular shaft (connecting element) |
| 82 | axis (horizontal through shaft) |
| 84 | bushing (FIG. 6) |
| 86 | cylindrical body (bushing) |
| 88 | circular collar (on shaft, against bushing) |
| 90 | threaded fastener |
| 92 | head (fastener) |
| 94 | threaded shaft (fastener) |
| 96 | washer (engaged by head of threaded fastener) marginally |
| 98 | upper bounding surface (slot) |
| 100 | lower bounding surface (slot). FIGS. 7-10 |
| 102, 104 | alternative motion converting mechanisms (left - right) |
| 108 | rod (connecting structure) |
| 109 | screws |

-continued

Parts List for Bicycle

| | |
|---|---|
| 110 | connecting element |
| 112 | circular shaft (connecting element) |
| 114 | part (connecting element) |
| 116 | open-ended passage (part - receiving rod) |
| 118 | sleeve (supporting circular shaft of element) |
| 120 | lengthwise axis (shaft) |
| 122 | collars (2 - on shaft) |
| 124 | set screws (in collars) |
| 126 | lower surface (rod) |
| 128 | inner, lower surface (part - in passage) |
| 130 | upper surface (rod) |
| 132 | upper inner surface (part - in passage) |
| 134 | substitute connecting structure (right pedal) |
| 138 | rod |
| 140 | one end (rod) |
| 142 | screw (at one end of rod) |
| 144 | opposite end (rod) |
| 146 | socket |
| 148 | support structure (for socket) |

The embodiments of an invention in which an exclusive property or privilege is claimed are defined as follows:

1. A bicycle propelled by stepping motion, comprising:
   a) a frame;
   b) a forward wheel and a rear wheel, each of the wheels mounted to the frame for rotation relative to the frame about a horizontal rotational axis of the wheel;
   c) a steering wheel coupled to the forward wheel for steering the bicycle;
   d) an axle mounted to the frame for relative rotation about a horizontal rotational axis of the axle;
   e) a drive sprocket fixed to the axle for rotation together about the horizontal rotational axis of the axle;
   f) a driven sprocket mounted to the rear wheel for rotation together in a forward angular direction about the horizontal rotational axis of the rear wheel;
   g) an endless chain coupling the drive sprocket and the driven sprocket for rotation together;
   h) a pair of pedals, each of the pedals mounted to the frame for relative pivoting between an upper position and a lower position of the pedal;
   i) biasing means urging each of the pedals from its lower position to its upper position;
   j) each of the pedals associated with motion converting means for rotating the drive sprocket relative to the frame in the forward angular direction in response to downward pivoting of the pedal, the motion converting means comprising:
      i. a crank arm;
      ii. a clutch mechanism coupling the crank arm to the axle such that the crank arm rotates with the axle in the forward angular direction and free-wheels relative to the axle when rotated in an opposite angular direction relative to the axle:
      iii. a connecting element attached to the crank arm such that the connecting element revolves along a circle centered about the rotational axis of the axle as the crank arm rotates about the rotational axis of the axle; and,
      iv. a connecting structure attached to the pedal, the connecting structure supporting the connecting element for relative displacement in sliding contact along an arcuate path defined by the connecting structure, the arcuate path shaped such that, as the pedal pivots between its upper and lower positions, the connecting structure engages the connecting element with a surface oriented substantially normal to the circle along which the connecting element revolves; whereby a rider can propel the bicycle by stepping on the pedals.

2. The bicycle of claim 1 in which, in the motion converting means associated with each of the pedals:
   a) the connecting structure comprises a curved slot that defines the arcuate path; and,
   b) the connecting element extends horizontally into the slot and travels along the slot as the pedal displaces between its upper and lower positions.

3. The bicycle of claim 1 in which, in the motion converting means associated with each of the pedals:
   a) the connecting element comprises a circular shaft that extends horizontally into the slot; and,
   b) the slot has a substantially uniform width at least along portions of the slot normally traveled by the circular shaft.

4. The bicycle of claim 3 in which, in the motion converting means associated with each of the pedals, the connecting element includes a retaining element comprising:
   a) a head overlaying the curved slot; and,
   b) a threaded shaft attached to the head and threaded into the circular shaft.

5. The bicycle of claim 3 in which, in the motion converting means associated with each of the pedals:
   a) the connecting element comprises a bushing with a cylindrical body that surrounds the circular shaft and extends into the slot; and
   b) the bushing is formed of a sacrificial material softer than the material of the connecting structure defining the slot.

6. The bicycle of claim 1 in which, in the motion converting means associated with each of the pedals:
   a) the connecting structure comprises a rod shaped to define the arcuate path; and,
   b) the connecting element comprises a part with an open-ended passage through which the rod extends.

7. The bicycle of claim 6 in which each of the motion converting means comprises means permitting the part to rotate relative to the rod such that the part tilts in response to curvature of the rod as the part displaces along the rod thereby to align its passage with the rod.

8. The bicycle of claim 6 in which, in the motion converting means associated with each of the pedals:
   a) the connecting element comprises a shaft to which the part is fixed; and,
   b) the crank arm comprises shaft supporting means supporting the shaft for rotation about a horizontal axis such that the part tilts in response to curvature of the rod as the part displaces along the rod thereby to align its passage with the rod.

9. The bicycle of claim 8 in which, in the motion converting means associated with each of the pedals, the shaft supporting means comprise:
   a) a sleeve attached to the crank arm and receiving the shaft of the connecting element for relative rotation; and,
   b) a pair of collars each mounted around the shaft at a different end of the sleeve and fastened to the shaft.

10. The bicycle of claim 9 in which, in the motion converting means associated with each of the pedals, each of the collars is fastened to the shaft with a set screw threaded into the collar and contacting the shaft.

11. The bicycle of claim 6 in which, in the motion converting means associated with each of the pedals, the connecting structure comprises:
   a) a socket mounted to the pedal and shaped to receive one end of the rod; and, b) releasable fastening means fastening an opposing end of the rod to the pedal.

12. A bicycle propelled by stepping motion, comprising:
a) a frame;
b) a forward wheel and a rear wheel, each of the wheels mounted to the frame for rotation relative to the frame about a horizontal rotational axis of the wheel;
c) a steering wheel coupled to the forward wheel for steering the bicycle;
d) an axle mounted to the frame for relative rotation about a horizontal rotational axis of the axle;
e) a drive sprocket fixed to the axle for rotation together about the horizontal rotational axis of the axle;
f) a driven sprocket mounted to the rear wheel for rotation together in a forward angular direction about the horizontal rotational axis of the rear wheel;
g) an endless chain coupling the drive sprocket and the driven sprocket for rotation together;
h) a pair of pedals, each of the pedals mounted to the frame for relative pivoting between an upper position and a lower position of the pedal;
i) biasing means urging each of the pedals from its lower position to its upper position;
j) each of the pedals associated with motion converting means for rotating the drive sprocket relative to the frame in the forward angular direction in response to downward pivoting of the pedal, the motion converting means comprising:
  i. a crank arm;
  ii. a clutch mechanism coupling the crank arm to the axle such that the crank arm rotates with the axle in the forward angular direction and free-wheels relative to the axle when rotated in an opposite angular direction relative to the axle;
  iii. a connecting element attached to the crank arm such that the connecting element revolves along a circle centered about the rotational axis of the axle as the crank arm rotates about the rotational axis of the axle; and,
  iv. a connecting structure attached to the pedal, the connecting structure comprising an arcuate slot receiving the connecting element for relative displacement in sliding contact along the slot, the slot shaped such that, as the pedal pivots between its upper and lower positions, the connecting structure engages the connecting element with a surface oriented substantially normal to the circle along which the connecting element pivots; whereby a rider can propel the bicycle by stepping on the pedals.

13. The bicycle of claim 12 in which, in the motion converting means associated with each of the pedals:
a) the connecting element comprises a circular shaft that extends horizontally into the slot; and,
b) the slot has a substantially uniform width at least along portions of the slot normally traveled by the circular shaft.

14. The bicycle of claim 13 in which, in the motion converting means associated with each of the pedals, the connecting element includes a retaining element comprising:
a) a head overlaying the curved slot; and,
b) a threaded shaft attached to the head and threaded into the circular shaft.

15. The bicycle of claim 13 in which, in the motion converting means associated with each of the pedals: the connecting element comprises a bushing with a cylindrical body that surrounds the circular shaft and extends into the slot; and the bushing is formed of a sacrificial material softer than the material of the connecting structure defining the slot.

16. A bicycle propelled by stepping motion, comprising:
a) a frame;
b) a forward wheel and a rear wheel, each of the wheels mounted to the frame for rotation relative to the frame about a horizontal rotational axis of the wheel;
c) a steering wheel coupled to the forward wheel for steering the bicycle;
d) an axle mounted to the frame for relative rotation about a horizontal rotational axis of the axle;
e) a drive sprocket fixed to the axle for rotation together about the horizontal rotational axis of the axle;
f) a driven sprocket mounted to the rear wheel for rotation together in a forward angular direction about the horizontal rotational axis of the rear wheel;
g) an endless chain coupling the drive sprocket and the driven sprocket for rotation together;
h) a pair of pedals, each of the pedals mounted to the frame for relative pivoting between an upper position and a lower position of the pedal;
i) biasing means urging each of the pedals from its lower position to its upper position;
j) each of the pedals associated with motion converting means for rotating the drive sprocket relative to the frame in the forward angular direction in response to downward pivoting of the pedal, the motion converting means comprising:
  i. a crank arm;
  ii. a clutch mechanism coupling the crank arm to the axle such that the crank arm rotates with the axle in the forward angular direction and free-wheels relative to the axle when rotated in an opposite angular direction relative to the axle;
  iii. a connecting element attached to and extending horizontally from the crank arm such that the connecting element revolves along a circle centered about the rotational axis of the axle as the crank arm rotates about the rotational axis of the axle, the connecting element comprising a part with an open-ended passage; and,
  iv. a connecting structure attached to the pedal, the connecting structure comprising a rod that extends through the open-ended passage of the part thereby mounting the connecting element for sliding displacement along the rod, the rod shaped to define an arcuate path for displacement of the connecting element, the arcuate path shaped such that, as the pedal pivots between its upper and lower positions, the connecting element contacts the rod with a surface oriented substantially normal to the circle along which the connecting element revolves;
  v. whereby a rider can propel the bicycle by stepping on the pedals.

17. The bicycle of claim 16 in which each of the motion converting means comprises means permitting the part to rotate relative to the rod such that the part tilts in response to curvature of the rod as the part displaces along the rod thereby to align its passage with the rod.

18. The bicycle of claim 16 in which, in the motion converting means associated with each of the pedals:
a) the connecting element comprises a shaft to which the part is fixed; and,
b) the crank arm comprises shaft supporting means supporting the shaft for rotation about a horizontal axis such that the part tilts in response to curvature of the rod as the part displaces along the rod thereby to align its passage with the rod.

19. The bicycle of claim 18 in which, in the motion converting means associated with each of the pedals, the shaft support means comprise:
 a) a sleeve attached to the crank arm and receiving the shaft of the connecting element for relative rotation; and,
 b) a pair of collars mounted to the shaft at opposite ends of the sleeve and fastened to the shaft.

20. The bicycle of claim 19 in which, in the motion converting means associated with each of the pedals, each of the collars is fastened to the shaft with a set screw threaded into the collar and contacting the shaft.

21. The bicycle of claim 16 in which, in the motion converting means associated with each of the pedals, the connecting structure comprises:
 a) a socket mounted to the pedal and shaped to receive one end of the rod; and,
 b) releasable fastening means fastening an opposing end of the rod to the pedal.

\* \* \* \* \*